US010237687B2

(12) United States Patent
Venkatraman et al.

(10) Patent No.: US 10,237,687 B2
(45) Date of Patent: Mar. 19, 2019

(54) TECHNIQUES FOR ALLOCATING POSITIONING SIGNAL ACQUISITION TASKS AMONG A PLURALITY OF CO-LOCATED MOBILE DEVICES

(71) Applicant: QUALCOMM Incorporated, San Diego, CA (US)

(72) Inventors: Sai Pradeep Venkatraman, Santa Clara, CA (US); Weihua Gao, San Jose, CA (US); Benjamin A. Werner, San Carlos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 14/475,271

(22) Filed: Sep. 2, 2014

(65) Prior Publication Data
US 2016/0066147 A1  Mar. 3, 2016

(51) Int. Cl.
*H04W 4/02* (2018.01)
*H04W 24/10* (2009.01)
*G01S 5/00* (2006.01)

(52) U.S. Cl.
CPC .......... *H04W 4/023* (2013.01); *G01S 5/0072* (2013.01); *H04W 24/10* (2013.01)

(58) Field of Classification Search
CPC ....... G01S 5/0242; H04W 4/02; H04W 8/005; H04W 72/1215; H04W 4/021; H04W 4/20; H04W 72/12; H04W 84/18; H04L 4/20; H04L 67/104; H04L 67/06; H04L 47/70; H04L 47/783; G06Q 10/06
See application file for complete search history.

(56) References Cited

U.S. PATENT DOCUMENTS

| 8,320,877 | B2 | 11/2012 | Hansen et al. | |
| 8,583,142 | B2 | 11/2013 | Das et al. | |
| 9,213,081 | B2 | 12/2015 | Tarlow et al. | |
| 2002/0098849 | A1* | 7/2002 | Bloebaum | G01S 5/0072 455/456.3 |
| 2006/0025869 | A1 | 2/2006 | Virdi et al. | |
| 2006/0095582 | A1* | 5/2006 | Nitya | H04W 28/065 709/236 |
| 2006/0258369 | A1* | 11/2006 | Burroughs | G01S 5/0205 455/456.1 |
| 2008/0218407 | A1* | 9/2008 | Norda | G01S 19/14 342/357.46 |

(Continued)

FOREIGN PATENT DOCUMENTS

| CN | 101855518 A | 10/2010 |
| CN | 103391228 A | 11/2013 |

(Continued)

OTHER PUBLICATIONS

International Search Report and Written Opinion—PCT/US2015/047994—ISA/EPO—dated Dec. 4, 2015.

*Primary Examiner* — Quan M Hua
(74) *Attorney, Agent, or Firm* — Hunter Clark PLLC

(57) ABSTRACT

Various techniques are provided that may be implemented at one or more of a plurality of co-located mobile devices. For example, a first mobile device may identify a plurality of signal acquisition tasks, transmit a request indicative of a subset of the plurality of signal acquisition tasks to be performed by a second mobile device, and receive a response to the request.

32 Claims, 4 Drawing Sheets

(56) References Cited

U.S. PATENT DOCUMENTS

| | | | |
|---|---|---|---|
| 2009/0177399 A1* | 7/2009 | Park | G01S 19/48 |
| | | | 701/300 |
| 2011/0205946 A1 | 8/2011 | Avital et al. | |
| 2011/0291882 A1 | 12/2011 | Walsh et al. | |
| 2012/0021764 A1 | 1/2012 | Enright | |
| 2012/0024932 A1 | 2/2012 | Haasz | |
| 2012/0249372 A1* | 10/2012 | Jovicic | G01S 1/042 |
| | | | 342/451 |
| 2013/0281110 A1* | 10/2013 | Zelinka | G01S 5/0284 |
| | | | 455/456.1 |
| 2013/0293580 A1* | 11/2013 | Spivack | G06Q 30/0643 |
| | | | 345/633 |
| 2013/0335273 A1* | 12/2013 | Pakzad | G01C 21/206 |
| | | | 342/458 |
| 2014/0235264 A1 | 8/2014 | Venkatraman et al. | |
| 2015/0111607 A1* | 4/2015 | Baldwin | H04W 4/02 |
| | | | 455/500 |

FOREIGN PATENT DOCUMENTS

| | | |
|---|---|---|
| WO | WO-2013191970 A1 | 12/2013 |
| WO | WO-2014074351 A1 | 5/2014 |

\* cited by examiner

TECHNIQUES FOR ALLOCATING POSITIONING SIGNAL ACQUISITION TASKS AMONG A PLURALITY OF CO-LOCATED MOBILE DEVICES

BACKGROUND

1. Field

The subject matter disclosed herein relates to electronic devices, and more particularly to methods, apparatuses and articles of manufacture for use by and/or in a first mobile device to determine a position fix of an object co-located with the first mobile device and at least one other mobile device.

2. Information

As its name implies, a mobile device may be moved about, e.g. typically being carried by or otherwise co-located in some manner with an object, such as, e.g., a person, an animal, a machine, etc. By way of some non-limiting examples, a mobile device may take the form of a cellular telephone, a smart phone, a tablet computer, a laptop computer, a wearable computer, a navigation and/or tracking device, etc.

Certain mobile devices may be enabled to provide, support, and/or otherwise make use of certain wireless signal based positioning techniques/services, e.g., applying various satellite positioning system (SPS) technologies, various cellular technologies, various wireless indoor positioning technologies, and/or the like or some combination thereof. In certain instances, a mobile device may be provided with positioning assistance data that may enable the mobile device to estimate its location (e.g., with regard to a map, etc.) using one or more positioning techniques or technologies. As such, a mobile device that may be co-located with an object may be able to indicate, at least in part, a reasonable position and/or other like information regarding the movement or positioning of the object. However, in certain instances, certain wireless signals used for positioning may become unavailable to a mobile device (e.g., due to attenuation, scattering, absorption, reflections, interference, etc.).

SUMMARY

In accordance with certain aspects, a method may be provided that comprises, at a mobile device: identifying a plurality of signal acquisition tasks corresponding to a wireless signal based positioning process, the wireless signal based positioning process being performed, at least in part, by the mobile device; transmitting one or more signals to a second mobile device representing a request indicative of a subset of the plurality of signal acquisition tasks to be performed by the second mobile device, the mobile device and the second mobile device being co-located with an object; and receiving one or more signals from the second mobile device representing a response to the request.

In accordance with certain aspects, an apparatus for use in a mobile device may be provided which comprises: means for identifying a plurality of signal acquisition tasks corresponding to a wireless signal based positioning process, the wireless signal based positioning process being performed, at least in part, by the mobile device; means for transmitting a request to a second mobile device, the request indicating a subset of the plurality of signal acquisition tasks to be performed by the second mobile device, the mobile device and the second mobile device being co-located with an object; means for receiving a response to the request from the second mobile device; and means for determining a position fix for the object based, at least in part, on the response.

In accordance with certain aspects, a mobile device may be provided which comprises: a communication interface; and a processing unit to: identify a plurality of signal acquisition tasks corresponding to a wireless signal based positioning process, the wireless signal based positioning process being performed, at least in part, by the mobile device; initiate transmission of a request to a second mobile device via the communication interface, the request indicating a subset of the plurality of signal acquisition tasks to be performed by the second mobile device, the mobile device and the second mobile device being co-located with an object; obtain a response to the request from the second mobile device via the communication interface; and determine a position fix for the object based, at least in part, on the response.

In accordance with certain aspects, an article of manufacture may be provided which comprises a non-transitory computer readable medium having stored therein computer implementable instructions executable by a processing unit of a mobile device to: identify a plurality of signal acquisition tasks corresponding to a wireless signal based positioning process, the wireless signal based positioning process being performed, at least in part, by the mobile device; initiate transmission of a request to a second mobile device, the request indicating a subset of the plurality of signal acquisition tasks to be performed by the second mobile device, the mobile device and the second mobile device being co-located with an object; obtain a response to the request from the second mobile device; and determine a position fix for the object based, at least in part, on the response.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
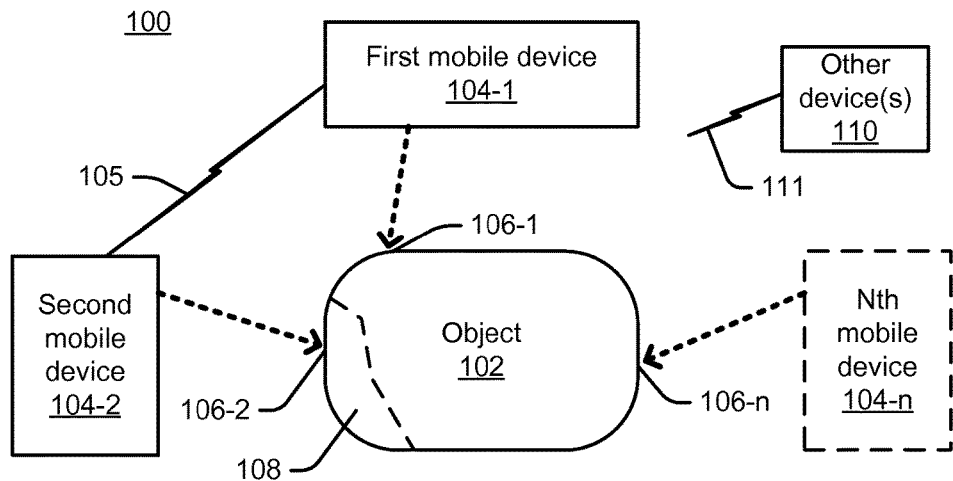
FIG. 1 is a schematic block diagram illustrating an example arrangement of representative electronic devices including an example first mobile device that may determine a position fix of an object co-located with the first mobile device and at least one other mobile device, in accordance with certain example implementations.

Various example techniques are provided herein which may be implemented at one or more of a plurality of mobile devices to implement various processing schemes to determine a position fix of an object co-located with the plurality of mobile devices.

As may be appreciated, in certain instances a person holding or carrying a first mobile device such as a smartphone may also wear or carry a second mobile device such as a wearable computing device and/or the like, which may be attachable so as to be co-located with a particular point of the person. For example, a person may wear a smart watch on his/her wrist, in addition to carrying a smartphone in his/her pocket or purse, etc. In a particular implementation, a wireless communication link (e.g., Bluetooth, near field communication (NFC) link, and/or the like) may be established between the first mobile device (e.g., a hand held communication/computing device) and one or more other mobile devices, such as, e.g., a second mobile device possibly in the form of a wearable computing device. Such communication capabilities may, in certain instances, be used to exchange (e.g., transmitted and/or received) various signals (e.g., representing data, measurements, instructions, messages, etc.).

In certain instances, one or more exchanged signals may be used to discover, verify and/or otherwise identify in some manner a presence, a capability, and/or other like information regarding one or more mobile devices that may be co-located with an object. In another example, certain exchanged signals may support techniques for coordinating the gathering, processing, storage, and/or the like of some combination thereof, of information that may be useful for positioning and navigation capabilities, e.g., relating to the object. Here, for example, it may be useful at times for wireless signal based positioning related measurements and/ or other like data and/or instructions to be shared between mobile devices, e.g., to possibly support various coordinated, collaborative, and/or other like processing schemes relating to the object in some manner.

While various example types of mobile devices are illustrated herein by way of example, it should be kept in mind that the various example techniques provided herein may be applied to a wide variety of mobile devices that may be co-located with an object. Moreover, claimed subject matter is not intended to necessarily be limited by any of these examples.

In accordance with certain example implementations, a first mobile device may identify a presence of one or more other mobile devices (e.g., a second mobile device, etc.). Several examples are provided in greater detail herein illustrating various techniques by which a mobile device may identify a presence of one or more other devices. A first mobile device may, for example, identify a presence of another mobile device (e.g., a second mobile device) based, at least in part, on one or more signals (e.g., possibly an exchange of one or more signals over a wireless communication link with the second mobile device as previously mentioned), receiving one or more user inputs, receiving one or more signals from one or more other devices (e.g., a server, etc.) indicating such a presence, and/or other like techniques or some combination thereof.

With this in mind, a first mobile device may, for example, identify a presence of another mobile device (e.g., a second mobile device) based, at least in part, on a decision that the first mobile device and the second mobile device are co-located with an object. By way of an initial example, in certain instances an object may comprise a person, a first mobile device may comprise a smartphone or the like, and a second mobile device may comprise a smart watch or the like, etc., each of which may each be carried in some manner by a person. For example, a smartphone or the like may be held in a person's hand at times, while placed in a holder, a pocket, a purse, a satchel, a backpack, etc., at other times. For example, a smart watch or the like may, at times, be fixed around a person's wrist, arm, ankle, etc., or possibly worn on their head (e.g., possibly in some form of a headband, a hat, glasses, headphones, etc.) or perhaps provided as part of some particular clothing, jewelry, etc., that may be worn at times by a person. Of course, at times such a smart watch or the like may be placed in a holder, a pocket, a purse, a satchel, a backpack, etc. In other example implementations, an object may comprise an animal or a machine, which may "carry" two or more mobile devices co-located with the object.

In certain example implementations, a (first) mobile device may identify a plurality of signal acquisition tasks corresponding to a wireless signal based positioning process that may be performed, at least in part, by the mobile device, and possibly with assistance from one or more other mobile devices (e.g., a second mobile device) co-located with an object. By way of a non-limiting example, a wireless signal based positioning process may determine all or part of a position fix of the object based, at least in part, on one or more positioning measurement values obtained from one or more wireless positioning signals. Accordingly, there may be a need to acquire one or more wireless positioning signals to obtain such positioning measurement value(s).

In certain example implementations, a wireless signal based positioning process may comprise a plurality of signal acquisition tasks. For example, in certain instances, e.g., an example signal acquisition task may correspond to a desire to search for and possibly acquire one or more wireless positioning signals, and/or to otherwise obtain one or more corresponding positioning measurement values.

In certain example implementations, having a plurality of signal acquisition tasks identified, a mobile device may request assistance from one or more other mobile devices that are co-located with the object in performing one or more such signal acquisition tasks. For example, in certain implementations a first mobile device may transmit a request to a second mobile device seeking assistance, wherein the request for assistance may be indicative of a subset (i.e., one or more but not all) of the plurality of signal acquisition tasks to be performed or which may be otherwise desirable for a wireless signal based positioning process. In certain instances, one or more of the signal acquisition tasks identified in such a request for assistance or otherwise indicated in some manner may be particularly selected for the second mobile device, e.g., based, at least in part, one or more factors/considerations.

With this in mind and as described in greater detail herein in certain example implementations, a first mobile device may select one or more signal acquisition tasks to be indicated in a request for assistance to one or more other mobile device based, at least in part, on a type of wireless positioning signal to be acquired. Thus, for example, in certain instances a type of wireless positioning signal may be indicative, at least in part, of one or more wireless technologies (e.g., cellular, CDMA, GSM, LTE, WiFi, WLAN, IEEE 802.11, GSM, GPS, Glonass, etc.) that may be used in transmitting one or more wireless positioning signals. In another example, in certain instances, a type of wireless positioning signal may be indicative, at least in part, of one or more transmitting devices (e.g., one or more terrestrial transmitting devices, one or more satellite vehicles (SVs), etc.) that may be used in transmitting one or more wireless positioning signals. In still other examples, in certain instances, a type of wireless positioning signal may be indicative, at least in part, of one or more frequency bands, and/or one or more signaling channels that may be used in transmitting one or more wireless positioning signals. In yet another example, in certain instances, a type of wireless positioning signal may be indicative, at least in part, of a type of positioning measurement value that may be obtained, at least in part, based on one or more acquired wireless positioning signals. Here, for example, a type of positioning measurement value may be indicative, at least in part, of a measurement value resolution, a signal strength measurement, a signal propagation time measurement, and/or the like or some combination thereof, just to name a few examples.

In certain example implementations, a first mobile device may select one or more particular signal acquisition tasks to be indicated in a request for assistance and/or the like based, at least in part, on one or more operative conditions corresponding to one or more of the plurality of mobile devices that may be co-located with an object. Thus, in certain instances, an operative condition of a particular mobile device may be indicative in some manner of whether the mobile device may or may not be available or otherwise suitable for providing certain types of assistance. For example, an operative condition may indicate, at least in part, that a mobile device may only be capable of acquiring certain types of wireless positioning signals, may be temporarily unavailable to assist for various reasons (e.g., low on power, busy with other processes, signaling appears obstructed in some manner, authorization lacking, etc.), and/or the like, just to name a few examples. Hence, in certain instances, an operative condition of a mobile device may be based, at least in part, on a signaling condition observed by the mobile device, a motion sensed by an inertial sensor and/or an environmental sensor of the mobile device, a sensed proximity of the mobile device to some surface/matter as may be detected via a proximity sensor of the mobile device, a light condition sensed by one or more sensors, cameras, and/or the like of the mobile device, a sound condition sensed by one or more sensors, microphones, and/or the like of the mobile device, one or more operating modes and/or the like of the mobile device, one or more user inputs received by the mobile device, and/or the like or some combination thereof.

The examples provided herein, and particularly above, are intended to represent just a few examples of operative conditions that may be identified. Furthermore, it should be understood that different mobile devices may have different operative conditions. Also, it should be understood that, in certain instances, an operative condition may be independently identified by a corresponding mobile device and possibly shared with other devices. For example, a second mobile device may identify one or more operative conditions and transmit such information to a first mobile device, and/or possibly some other device (e.g., a server, etc.). In certain other example implementations, an operative condition for a particular mobile device may be identified by another device, e.g., based, at least in part, on applicable information regarding and/or from the particular mobile device. For example, a first mobile device may (independently or with support) identify one or more operative conditions for a second mobile device (e.g., based on applicable information regarding and/or from the second mobile device). In another example, a server or other like computing device may (independently or with support) identify one or more operative conditions for a second mobile device (e.g., based on applicable information regarding and/or from the second mobile device), and transmit one or more signals indicative of such operative condition(s) to a first mobile device.

In certain example implementations, a request for assistance transmitted by a first mobile device to a second mobile device may be indicative of a task schedule and/or the like corresponding to one or more of signal acquisition tasks to be performed by the second mobile device. For example, a task schedule may indicate one or more particular times or particular periods of time corresponding to the requested assistance (e.g., corresponding to scanning/searching for a wireless positioning signal, determining one or more positioning measurement values, etc.).

In certain example implementations, a request for assistance transmitted by a first mobile device to a second mobile device may be indicative of a response schedule and/or the like corresponding to one or more responses to be received from the second mobile device. For example, a response schedule may indicate one or more particular times or particular periods of time indicating when one or more responses, e.g., corresponding to one or more requests for assistance, should be transmitted to the first mobile device.

Having transmitted a request for assistance, e.g., to a second mobile device as described above, a first mobile device may subsequently receive one or more signals from the second mobile device representing a response to the request for assistance. In certain instances, for example, a response from a mobile device may be indicative of one or more positioning measurement values that may be determined based, at least in part, on one or more second wireless positioning signals acquired by the second mobile device.

In certain example implementations, a first mobile device, in addition to requesting assistance from one or more other mobile devices, may perform one or more of the plurality of signal acquisition tasks that may not have been represented in a request for assistance. Thus, in certain instances, a first mobile device may obtain one or more positioning measurement values based, at least in part, on one or more wireless positioning signals acquired by the first mobile device.

Having obtained one or more positioning measurement values from one or more other mobile devices, a first mobile device may, for example, determine all or part of a position fix or the like for the object based, at least in part, on at least one of the positioning measurement values. In certain instances, a first mobile device may, for example, determine all or part of a position fix or the like based, at least in part, on one or more first positioning measurement values corresponding to one or more wireless positioning signals acquired by the first mobile device, and one or more second positioning measurement values corresponding to one or more wireless positioning signals acquired by the second mobile device (e.g., as requested by the first mobile device).

Those skilled in the art should recognize that the example techniques provided herein may be implemented, at least in part, in a first mobile device, to allocate or otherwise assign signal acquisition tasks among a plurality of mobile devices co-located with an object. In certain instances, a second mobile device may, for example, receive a request for assistance from a first mobile device to perform a particular signal acquisition task which may have been uniquely assigned the second mobile device. In certain other instances, a second mobile device may, for example, receive a request for assistance from a first mobile device to perform a particular signal acquisition task which may also have been assigned to one or more other mobile devices.

Attention is drawn next to FIG. 1, which is a schematic diagram illustrating an environment 100 within which an object 102 may enter, leave, and/or otherwise move or be moved about, in accordance with an example implementation. As illustrated, a first mobile device 104-1 may be provided and identified as being initially co-located with a first point 106-1 of object 102. Similarly, as shown, a second mobile device 104-2 may be provided and identified as being initially co-located with a second point 106-2 of object 102. Second mobile device 104-2 may transmit one or more wireless signals to first mobile device 104-1, as represented by wireless communication link 105. In certain instances, wireless communication link may represent a unidirectional communication capability, or a bidirectional communication capability.

Although many of the examples presented herein are based on techniques applied using first mobile device 104-1 and second mobile device 104-2, it is not intended that the techniques or claimed subject matter necessarily be limited to just two mobile devices. Accordingly, as illustrated in FIG. 1, techniques and claimed subject matter may apply to a plurality mobile devices (e.g., further represented by Nth mobile device 104-$n$), which may be individually identified as being initially co-located with particular points (represented by Nth point 106-$n$) of object 102. Although not shown, it should be understood that Nth mobile device 104-$n$ may be capable of unidirectional or bidirectional wireless communication with one or more other mobile devices, such as, for example, mobile device 104-1.

As further illustrated and represented by portion 108 of object 102, in certain instances object 102 comprise one or more parts or portions may move or be moved in some manner as to change object 102. Thus, in this example, it is assumed that portion 108 may move or be moved with respect to the remaining portion of object 102. For example, portion 108 may represent a leg of a person or an animal, or possible an arm or other like movable feature of a robot or machine.

As further illustrated in FIG. 1, in certain example implementations, one or more other devices 110 may be provided, which may transmit one or more wireless signals 111. By way of example, one or more other devices 110 may represent one or more computing devices (e.g., server(s), etc.), one or more communication networks (wired and/or wireless), the Internet, etc.

In another example, one or more other devices 110 may represent one or more transmitting devices that may transmit wireless signals 111 for use in wireless signal based positioning. Thus, for example, in certain instances, one or more other devices 110 may represent one or more satellite positioning systems (SPSs) that may transmit SPS signals from one or more space vehicles (SVs). In some embodiments, an SPS may, for example, comprise a global navigation satellite system (GNSS), such as the GPS or Galileo satellite systems. In other embodiments, one or more SVs may be from multiple GNSS such as, but not limited to, GPS, Galileo, Glonass, or Beidou (Compass) satellite systems. In other embodiments, one or more SVs may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples. In yet another example, one or more other devices 110 may represent one or more terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof.

Figure 2:
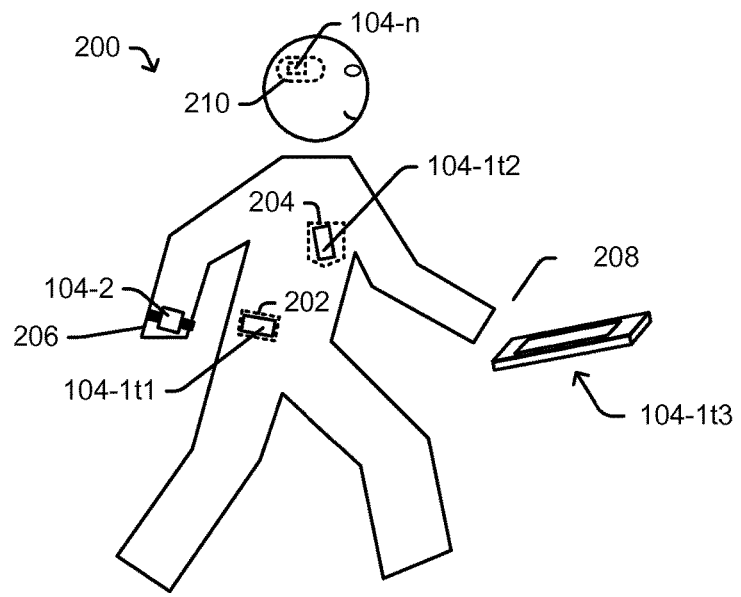
FIG. 2 is an illustrative diagram depicting an example arrangement of representative electronic devices including several example mobile devices that may be co-located with regard to an object comprising a person, in accordance with certain example implementations.

Attention is drawn next to FIG. 2, which is illustrative diagram showing a person 200 (e.g., one example type of an object) in relation to some example mobile devices. In this example, it is assumed that the person is ambulatory and engaged in a pedestrian movement (e.g., walking, running, standing, and/or the like or some combination thereof) from time to time. As shown, in certain instances and/or at certain times (e.g., time t1), person 200 may carry a first mobile device (identified as 104-1$t$1) in a holder 202 (e.g., possibly a mechanism that may be connected to a belt, possibly a pocket in an item of clothing near the waistline, etc.). Here, for example, the first mobile device may be identified as being co-located with the person's right hip, or the like. In another example, in certain instances and/or at certain times (e.g., time t2), person 200 may carry a first mobile device (identified as 104-1$t$2) in a jacket pocket 204. Here, for example, the first mobile device may be identified as being co-located with the person's torso. In a third example, in certain instances and/or at certain times (e.g., time t3), person 200 may grasp a first mobile device (identified as 104-1$t$3) in their left hand and hold it out in front of his/her body (identified in the region of 208) to interact with first mobile device in some manner. Here, for example, the first mobile device may have been initially identified as being co-located with the person's hip (e.g., as at time t1) or torso (e.g., as at time t2), however, as of time t3 the person has moved first mobile device. As may be appreciated, first measurements obtained from a first sensor (e.g., an accelerometer, a gyroscope, etc.) on the first mobile device corresponding to movements corresponding to the new position at time t3 may be substantially different from similar measurements obtained while first mobile device is more closely carried/held nearer the person's hip (time t1) and/or person's torso (time t2). In some instances, such changes may be indicative of an operational condition for a given mobile device, which may be considered in selecting one or more signal acquisition tasks to be performed by the mobile device experiencing such changes, and/or one or more other mobile devices.

As further illustrated in the simple drawing of FIG. 2, it should be understood that signal acquisition task(s) selected to be performed by a first mobile device, e.g., at times t1 or t2, may be selected based on tasks that may be less likely affected due to stowage in a pocket or holder that may under certain circumstances degrade signal reception in some manner. For same reason, at least on part, other signal acquisition tasks may be assigned to other mobile devices via one or more requests for assistance. However, different or additional signal acquisition task(s) may be selected to be performed by the first mobile device (and/or other mobile devices), for example, at time t3 where first mobile device is being held in a hand, since there may be relatively improved exposure to the environment for the first mobile device that may under certain circumstances improve some signal reception.

FIG. 2 illustrates an example second mobile device 104-2 in the form of a wearable computing device (here, e.g., a wristband, a wrist watch, etc.) which may be identified as being initially co-located near the wrist of the person's right arm as represented by point 206; and, also likewise, co-located with an object along with first mobile device 104-1. As may be expected, the location of second mobile device 104-2 in this example may lead, at times, to the second mobile device being more or less exposed to the environment, which may under certain circumstances improve signal reception and hence increase a potential availability of the second mobile device for assisting in wireless signal based positioning for the object, for example, by performing selected signal acquisition task(s) as identified in a request message from first mobile device 104-1.

FIG. 2 also illustrates an example Nth mobile device 104-n in the form of a wearable computing device (here, e.g., a headband, a hat, an earpiece, headphones, glasses, etc.) which may be identified as being initially co-located near a point on the person's head or face as represented by point 210 and, also likewise, co-located with an object along with first mobile device 104-1. Note that the Nth mobile device may comprise a "second mobile device", e.g., as recited in claimed subject matter. As may be expected, the location of Nth mobile device 104-n in this example may lead, at times, to the Nth mobile device being exposed to the environment, which may under certain circumstances improve or degrade signal reception and hence increase or decrease an ability or usefulness of the Nth mobile device to perform one or more signal acquisition tasks that may be selectively assigned by first mobile device 104-1 via a request message.

Figure 3:
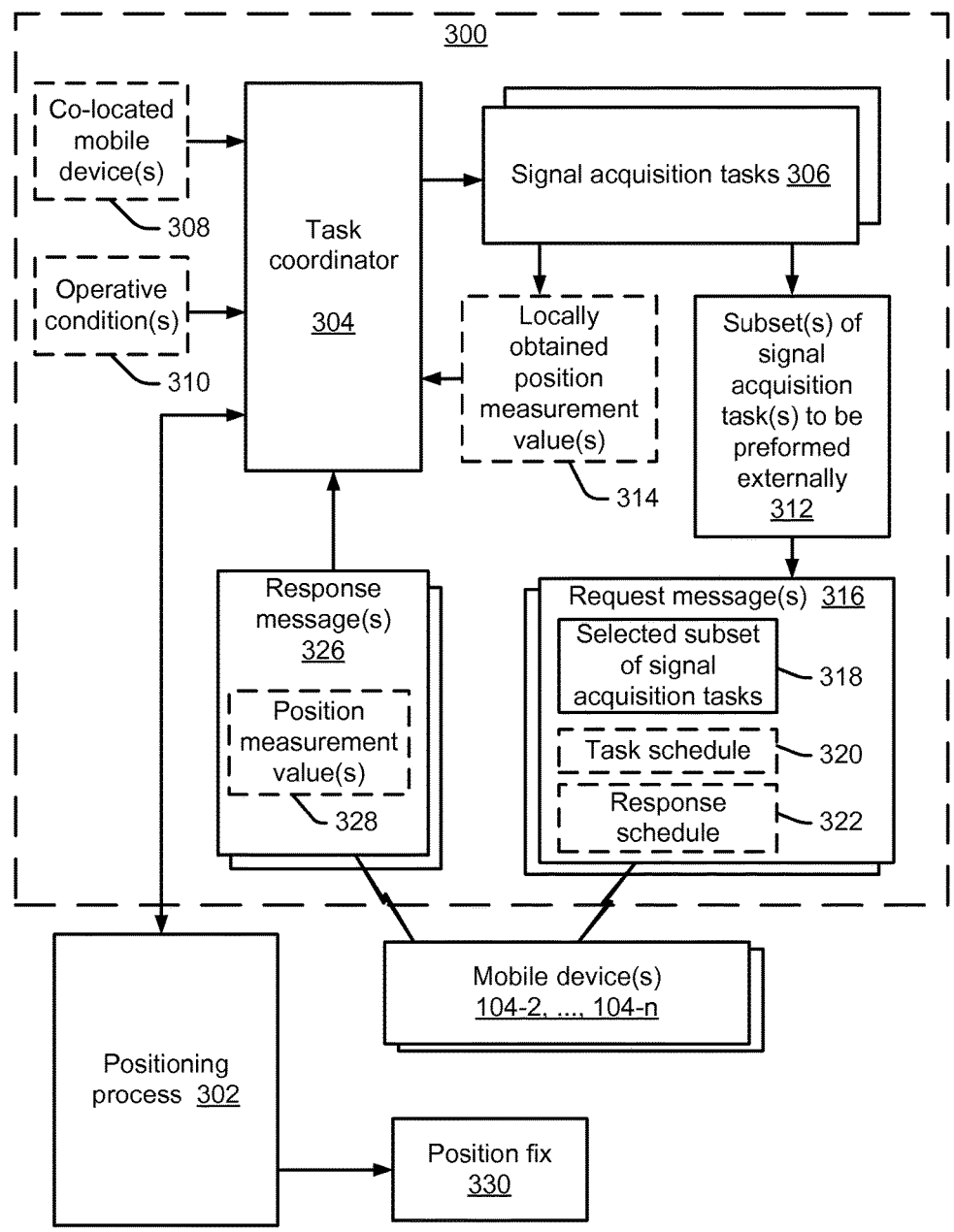
FIG. 3 is a schematic block diagram illustrating an apparatus that may be implemented in a first mobile device, e.g., as in FIG. 1, to determine a position fix of an object co-located with the first mobile device and at least one other mobile device, in accordance with certain example implementations.

Attention is drawn next to FIG. 3, which is a schematic diagram illustrating an example apparatus 300 that may, for example, be implemented in whole or part in first mobile device 104-1 (FIG. 1), in accordance with certain example implementations.

Example apparatus 300 may, for example, provide support for a positioning process 302, at least in part, by applying all or part of the techniques provided herein. For example, apparatus 300 may comprise a task coordinator 304 that may be operatively coupled to positioning process 302. In certain implementations, positioning process 302 may comprise, at least in part, a wireless signal based positioning process. Although illustrated as being separated in FIG. 3, it should be understood that in certain implementations that apparatus 300 may comprise all or part of positioning process 302, or vice versa. Additionally, it should be understood that FIG. 3 is not intended to represent all of the features within a first mobile device (or other mobile devices) that may be used, at least in part, by apparatus 300 and/or positioning process 302. For example, FIG. 3 does not include a communication interface or some portion thereof which may be provided in a mobile device to exchange signals with other devices, but instead includes simplified representative illustrations showing that an example request message 316 may be transmitted to one or more other mobile devices 104-2, . . . , 104-n (FIG. 1), and that an example response message 326 may be received from one or more other mobile devices 104-2, . . . , 104-n.

In this example, task coordinator 304 may identify a plurality of signal acquisition tasks 306 supportive of positioning process 302. By way of an example, in certain instances positioning process 302 may be able to determine a position fix 330 (of an object), at least in part, based on certain types of positioning signal measurements that may be obtained, at least in part, based on acquisition of certain wireless positioning signals, e.g., by one or more mobile devices co-located with the object. Thus, in certain instances one or more signal acquisition tasks 306 may be indicative of one or more desired positioning signal measurements, one or more wireless positioning signals to be acquired, and/or the like or some combination thereof.

In certain example implementations, task coordinator 304 may simply obtain one or more signal acquisition tasks 306 that have already been identified in some manner, for example, by positioning engine 302. In certain example implementations, task coordinator 304 may identify one or more signal acquisition tasks 306 based on various considerations and information, e.g., regarding positioning process 302, first mobile device 104-1 (FIG. 1), second mobile device 104-2, Nth mobile device 104-n, other devices 110, object 102, and/or the like or some combination thereof.

By way of an example, in certain instances task coordinator 304 may determine that positioning process 302 may make use, at least in part, of particular positioning signal measurements that may be obtained by acquiring particular wireless positioning signals. Accordingly, all or part of a set of signal acquisition tasks 306 may be identified based on such considerations and information.

In another example, in certain instances task coordinator 304 may determine that one or more mobile devices (co-located with an object) may obtain, at least in part, particular positioning signal measurements that may be obtained by acquiring particular wireless positioning signals. Thus, as shown, task coordinator 304 may, for example, consider various information corresponding to first mobile device 104-1, one or more co-located mobile devices 308, one or more corresponding operative conditions 310, and/or the like or some combination thereof, e.g., to identify all or part of a set of signal acquisition tasks 306.

By way of an example, a presence of one or more co-located mobile devices 308 may be identified based, at least in part, on one or more wireless signal(s) exchanged between the first mobile device comprising apparatus 300 and one or more other mobile devices. In certain instances, a presence of a co-located mobile device may be identified based, at least in part, on one or more user input(s) received by a first mobile device. Here, for example, a user input at a first mobile device may indicate an intended presence and/or approve of a possible presence of one or more mobile devices in co-location with the first mobile device with respect to an object. In yet another example, a presence of a co-located mobile device may be identified based, at least in part, on one or more external messages (signals) received by the first mobile device from one or more other devices (e.g., a server, etc.). For example, one or more such messages received by a first mobile device may indicate an intended presence and/or approve of a possible presence of one or more mobile devices in co-location with the first mobile device with respect to an object. As with all of the examples presented herein, the above examples claimed subject matter is not necessarily intended to be so limited.

One or more operative conditions 310 may, for example, be identified for the first mobile device comprising apparatus 300, and/or one or more of the co-located mobile devices 308. In certain instances, an operative condition of a particular mobile device may be identified, at least in part, based on various types of information regarding the particular mobile device. By way of example, in certain instances one or more previously observed signaling conditions corresponding to a particular mobile device may be considered, at least in part, to identify an operative condition. In certain instances, for example, one or more sensed motions corresponding to a particular mobile device may be considered, at least in part, to identify an operative condition. In certain instances, for example, one or more sensed proximity indications corresponding to a particular mobile device may be considered, at least in part, to identify an operative condition. In certain instances, for example, one or more light conditions and/or one or more sound conditions corresponding to a particular mobile device may be considered, at least in part, to identify an operative condition. In certain instances, for example, one or more operative mode indications corresponding to a particular mobile device (e.g., and/or some part thereof) may be considered, at least in part, to identify an operative condition. In certain instances, for example, one or more user inputs corresponding to a particular mobile device may be considered, at least in part, to identify an operative condition.

Thus, as may be appreciated, in certain instances an operative condition 310 may be based on a variety of factors that may be indicative in some manner as whether a mobile device may be more or less likely to be useful in providing/supporting certain wireless signal based positioning.

In certain example implementations, example apparatus 300 may obtain various types of information for consideration by task coordinator 304 in different ways. For example, task coordinator 304 may obtain information that may be indicative, at least in part, of one or more operative conditions of a particular mobile device by accessing such information, receiving such information, requesting such information, and/or by applying other like techniques or some combination thereof. For example, in certain implementations, task coordinator 304 may obtain information for consideration from a local memory subsystem of a first mobile device comprising apparatus 300. In another example, task coordinator 304 may obtain information for consideration from one or more other devices through a communication interface, e.g., by exchanging signals. Here, for example, in certain instances a first mobile device 104-1 (see FIG. 1) comprising apparatus 300 may obtain such information applicable to a second mobile 104-2 device directly from the second mobile device 104-2, and/or possibly indirectly via an Nth mobile device 104-n, and/or one or more other devices 110.

Task coordinator 304 may select one or more subsets of signal acquisition tasks, for example, from signal acquisition tasks 306, to be performed (e.g., initiated, attempted, completed) by one or more particular co-located mobile devices, e.g., to possibly obtain one or more desired position measurement values, and/or the like. Thus, for example, in certain instances task coordinator 304 may select one or more subsets 312 of signal acquisition tasks to be performed by one or more of the co-located mobile devices, e.g., externally with respect to the first mobile device comprising apparatus 300. In certain instances, task coordinator 304 may select one or more of signal acquisition tasks 306 for such a first mobile device to perform locally, which may result in one or more locally obtained position measurement values 314 being determined.

Apparatus 300 may initiate transmission of one or more signals representing one or more request messages 316, e.g., to one or more co-located mobile devices. As illustrated, in certain example implementations, a request message may be indicative of a selected subset of signal acquisition tasks 318, a task schedule 320, a response schedule 322, and/or the like or some combination thereof.

Apparatus 300 may obtain information, such as, one or more externally obtained position measurement values 328, e.g., via one or more response messages 326 received from one or more co-located mobile devices.

Task coordinator 304 may, in certain instances, provide all or part of one or more position measurement values (e.g., locally obtained, externally obtained) to positioning process 302. In certain implementations, all or part of one or more position measurement values may be further processed in some manner by apparatus 300 prior to being provided to positioning process 302. For example, in certain instances task coordinator 304 may combine, in some manner, two or more obtained position measurement values from one or more co-located mobile devices. Thus, for example, a (combined) position measurement value provided to positioning process 302 may correspond, at least in part, to an averaged or other like value for a period of time, a region of space, etc.

In another example, in certain instances task coordinator 304 may adjust, in some manner, one or more obtained position measurement values from one or more co-located mobile devices. Thus, for example, an (adjusted) position measurement value provided to positioning process 302 may correspond, at least in part, to a corrected, calibrated, off-set, weighted, and/or the like otherwise affected value. In certain instances, such a position measurement value may be affected in some manner with regard to format or form.

Positioning process 302 may use all or part of one or more position measurement values provided by apparatus 300 to determine, at least in part, a position fix 330 for the object.

In certain example implementations, a positioning measurement value may be indicative, at least in part, of any information in the form of data that may be used, at least in part, by positioning process 302 to determine a position fix for the object. Thus, for example, in certain instances a positioning measurement value may be indicative, at least in part, of one or more distances/ranges (e.g., a time of travel, a signal strength, a pseudorange, etc.) and/or the like, one or more location coordinates e.g., latitude, longitude, altitude, etc.) and/or the like, one or more identifiable spaces (e.g., a grid/node point, a room identifier, a location context identifier (LCI), a cellular ID, etc.), one or more movements (e.g., a heading, a speed, a trajectory, etc.), just to name a few examples.

In certain instances, one or more positioning measurement values may be further based, at least in part, on detected motions and/or the like from one or more inertial sensors (e.g., an accelerometer, a gyroscope, a pedometer, etc.), one or more environmental sensors (e.g., a magnetometer, a compass, a barometer, a light sensor, an sound/audio sensor, a proximity sensor, a thermometer, a strain gauge, etc.), on board a co-located mobile device.

At example block 332, all or part of a position fix (e.g., that may correspond to the object) may be determined, e.g., based, at least in part, on one or more of the positioning measurement values provided by apparatus 300. By way of some non-limiting examples, a position fix may be indicative, at least in part, of a relative and/or otherwise identifiable location of the object, e.g., determined with regard to a coordinate system, an electronic map, another object, a point in space, a structure, and/or the like or some combination thereof. In certain instances, a position fix may be based, at least in part, on one or more positioning measurement values corresponding to one of the mobile device(s) identified as being co-located with the object, e.g., the object's determined position fix may match a position fix of such mobile device, or possibly offset in some manner therefrom. In certain instances, a position fix may be based, at least in part, on positioning measurement values corresponding to a plurality of mobile devices identified as being co-located with the object. Here, for example, the object's determined position fix may be based, at least in part, on a combination of position fixes for two or more such mobile devices. Thus, in certain instances position fixes and/or obtained positioning measurement values for two or more mobile devices may be averaged or otherwise mathematically/statistically combined in some manner, e.g., possibly taking into account: a type, a shape, a modeled/expected behavior, etc., of the object; an age, an accuracy, etc., of one or more of the various position fixes and/or obtained positioning measurement values; a history of one or more of the various position fixes and/or obtained positioning measurement values, etc.; and/or the like or some combination thereof.

In certain instances, a position fix may be indicative, at least in part, of a motion or movement of the object, e.g., determined with regard to a coordinate system, an electronic map, another object, a point in space, a structure, and/or the like or some combination thereof.

It should be noted that dashed line boxes that appear in the drawings (e.g., example referenced items 106-n (FIG. 1), 104-n (FIG. 2), 308, 310, 314,320, 322, 328 (FIG. 3), 416, 418 (FIG. 4), 508 (FIG. 5A), 510, 512, 514, 516, 518, 520, 522, and 508' (FIG. 5B) are intended to illustrate additional/alternative devices, information/data, instructions/processes, and/or the like that may be provided/applied in certain example implementations. However, it should also be understood that example referenced items illustrated in solid line boxes in the drawing may be considered as additional/alternative devices, information/data, instructions/processes, and/or the like that may be provided/applied in certain example implementations. Thus, claimed subject matter is not intended to necessarily be so limited.

Figure 4:
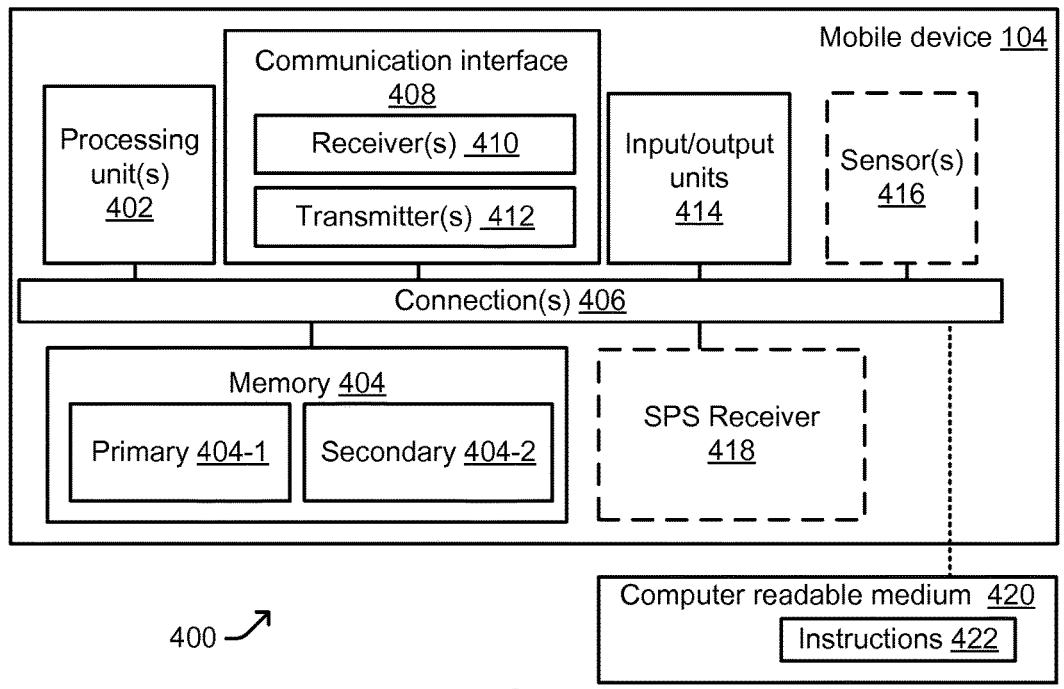
FIG. 4 is a schematic diagram illustrating certain features of an example computing platform that may be provisioned in whole or part within a mobile device, e.g., as in FIG. 1, in accordance with certain example implementations.

FIG. 4 is a schematic diagram illustrating certain features of an example special purpose computing platform 400 that may be provided within a mobile device according to the various techniques provided herein. It should be understood that all or part of the features shown in computing platform 400 may be provided in first mobile device 104-1, second mobile device 104-2, and/or Nth mobile device 104-n (FIG. 1). It should also be understood that the example features shown in computing device 400 are not intended to show an exhaustive list of features that may be provided within a mobile device. Further still, it should be understood that in certain instances, one or more, or all, of the mobile devices may be of the same or of a different type, form, manufacture, make, model, etc.

As illustrated, special purpose computing platform 400 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include some form of a system-on-a-chip (SOC), one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within the mobile device. Secondary memory 404-2 may comprise, for example, the same or similar type of memory as primary memory and/or one or more data storage devices or systems, such as, for example, a solid motion state memory drive, etc. In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special purpose computing platform 400 may, for example, further comprise one or more communication interfaces 408. Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, a wide area network, a personal area network, an intranet, the Internet, etc.

In accordance with certain example implementations, communication interface 408 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Representative mobile device 104 in FIG. 4 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, a microphone, a camera, an eye tracker, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, positioning and/or navigation related information, visual representations of electronic map, routing directions, etc., via a display mechanism and/or audio mechanism.

Representative mobile device 104 in FIG. 4 may, for example, comprise one or more sensors 416. For example, sensor(s) 416 may represent one or more environmental sensors, such as, e.g., a magnetometer or compass, a barometer or altimeter, etc., and which may be useful for positioning and/or determining a certain movements. For example, sensor(s) 416 may represent one or more inertial sensors, which may be useful in detecting certain movements. Thus for example, sensor(s) 416 may comprise one or more accelerometers, one or one or more gyroscopes. Further, in certain instances sensor(s) 416 may comprise and/or take the form of one or more input devices such as a sound transducer, a microphone, a camera, a light sensor, etc.

In certain instances, some mobile devices may comprise a satellite positioning system (SPS) receiver 418 for acquiring SPS signals 134 via one or more antennas (not shown). SPS receiver 418 may also process, in whole or in part, acquired SPS signals 134 for estimating a position and/or a motion of a mobile device. In certain instances, SPS receiver 418 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of a mobile device. In certain implementations, all or part of such processing of acquired SPS signals may be performed by other processing capabilities in a mobile device, e.g., processing unit(s) 402, memory 404, etc., in conjunction with SPS receiver 418. Storage of SPS or other signals for use in performing positioning operations may be performed in memory 404 or registers (not shown).

In certain instances, sensor(s) 416 may generate analog or digital signals that may be stored in memory 404 and processed by DPS(s) (not shown) or processing unit(s) 402 in support of one or more applications such as, for example, applications directed to positioning or navigation operations based, at least in part, on one or more positioning functions.

Processing unit(s) 402 may comprise a dedicated modem processor or the like that may be capable of performing baseband processing of signals acquired and down converted at receiver(s) 410 of communication interface 408 or SPS receiver 418. Similarly, a modem processor or the like may perform baseband processing of signals to be up converted for transmission by (wireless) transmitter(s) 412. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

Figure 5A:
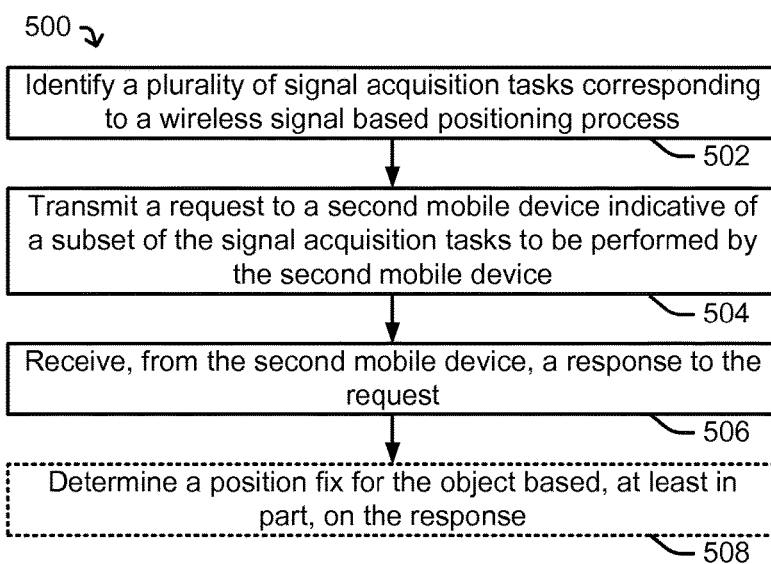
FIG. 5A and FIG. 5B are flow diagrams illustrating some example processes that may be implemented in a first mobile device, e.g., as in FIG. 1, to determine a position fix of an object co-located with the first mobile device and at least one other mobile device, in accordance with certain example implementations.

Attention is drawn next to FIG. 5A, which is a flow diagram illustrating an example process 500 that may be implemented in whole or in part by example first mobile device 104-1 (FIG. 1), example apparatus 300 (FIG. 3), example special purpose computing platform 400 (FIG. 4), and/or other like electronic devices/circuits, in accordance with certain example implementations.

At example block 502, at a first mobile device, a plurality of signal acquisition tasks corresponding to a wireless signal based positioning process may be identified. In certain example implementations, block 502 may comprise all or part of task coordinator 304 (FIG. 3) and/or make use of all or part of the example information considered thereby.

At example block 504, a request may be transmitted to a second mobile device indicative of a subset of the signal acquisition tasks to be performed by the second mobile device. In certain example implementations, such a request may comprise all or part of a request message 316 (FIG. 3).

At example block 506, a response may be received from a second mobile device. Such a response may correspond to a request as transmitted at block 504. In certain example implementations, such a response may comprise all or part of a response message 326 (FIG. 3).

At example block 508, a position fix for the object may be determined based, at least in part, on at least the response from block 506. In certain example implementations, block 508 may comprise all or part of positioning process 302 (FIG. 3) and/or make use of all or part of the example information considered thereby.

Figure 5B:
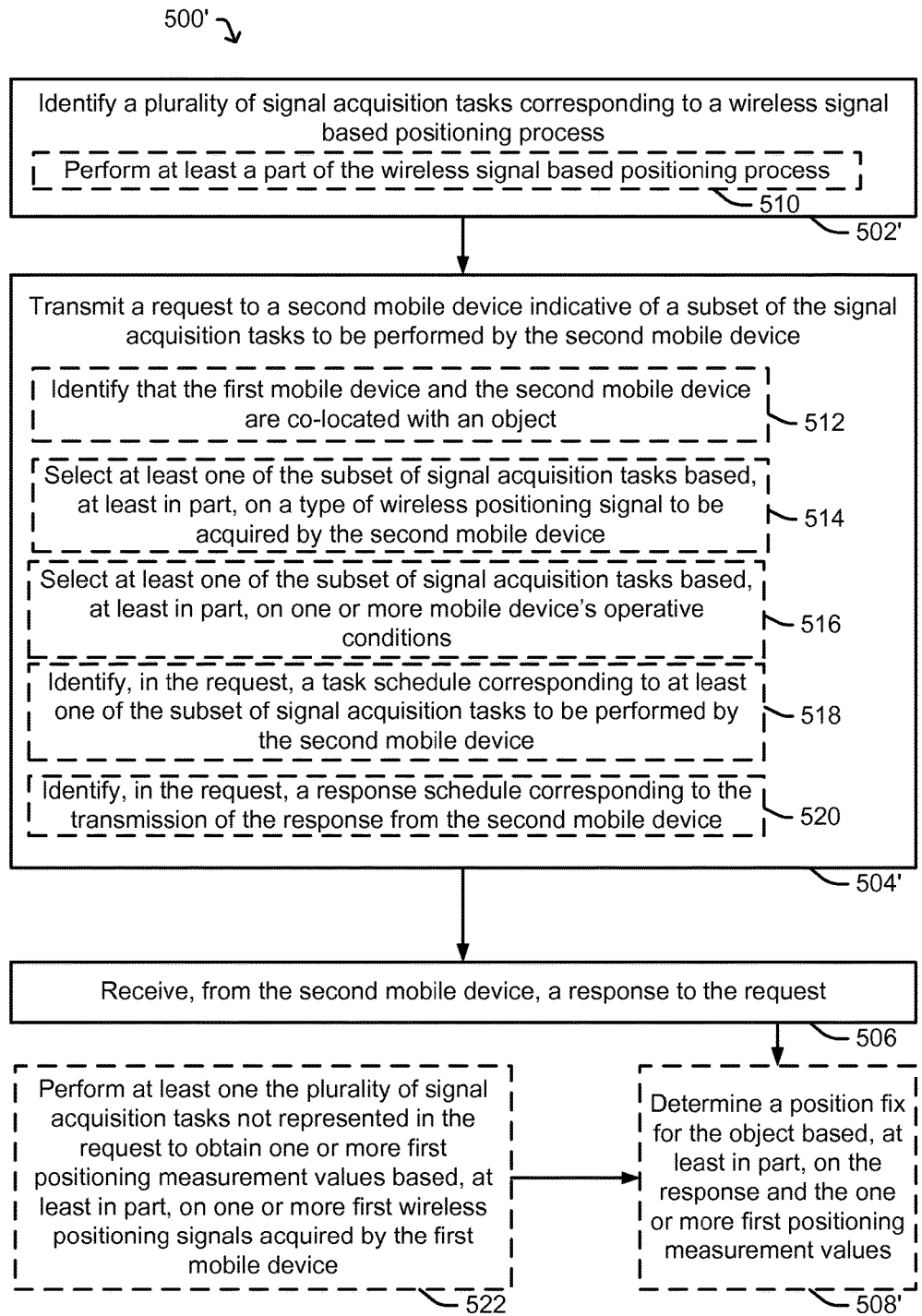

Attention is drawn next to FIG. 5B, which is a flow diagram illustrating an example process 500' that may be implemented in whole or in part by example first mobile device 104-1 (FIG. 1), example apparatus 300 (FIG. 3), example special purpose computing platform 400 (FIG. 4), and/or other like electronic devices/circuits, in accordance with certain example implementations.

In certain implementations, example block 502 in FIG. 5A may be replaced or otherwise modified in whole or part by example block 502' and/or example block 510, as shown in FIG. 5B. At example block 510, at least a part of the wireless signal based positioning process may be performed to identify one or more of the signal acquisition tasks.

In certain implementations, example block 506 in FIG. 5A may be replaced or otherwise modified in whole or part by example block 506' and/or example blocks 512, 514, 516, 518, and/or 520, as shown in FIG. 5B.

At example block 512, the first mobile device and at least a second mobile device may be identified as being co-located with an object. For example, as previously mentioned, wireless signals may be exchanged, user inputs obtained, etc., which may be indicative of co-located mobile devices.

At example block 514 at least one of the subset of signal acquisition tasks may be selected based, at least in part, on a type of wireless positioning signal to be acquired by the second mobile device. Here, for example, in certain instances information may be considered that may be indicative of applicable wireless technologies, transmitting devices, frequency bands, signaling channels, types of positioning measurement values, measurement value resolutions, and/or the like or some combination thereof, just to name a few examples.

At example block 516, at least one of the subset of signal acquisition tasks may be selected based, at least in part, on one or more operative conditions corresponding to the first mobile device, the second mobile device, one or more other mobile devices, or some combination thereof. For example, an operative condition may be indicative of whether a particular co-located mobile device may be more or less likely situated or suitable for performing a particular signal acquisition task.

At example block 518, a request to a second mobile device may be further indicative of a task schedule corresponding to at least one of the subset of signal acquisition tasks to be performed by the second mobile device. Here, for example, a task schedule may indicate one or more times, or periods of time, in which signal acquisition for one or more signal acquisition tasks may be preferably performed.

At example block 518, a request to a second mobile device may be further indicative of a response schedule corresponding to at least one of the subset of signal acquisition tasks to transmission of a response from the second mobile device. Here, for example, a response schedule may indicate one or more times, or periods of time, in which a response corresponding to one or more signal acquisition tasks may be preferably transmitted.

At example block 506, a response may be received from a second mobile device. Such a response may correspond to a request as transmitted at block 504'.

At example block 522, at least one the plurality of signal acquisition tasks not represented in a request at block 504', may be performed (locally) at the first mobile device to obtain one or more first positioning measurement values based, at least in part, on one or more first wireless positioning signals acquired by the first mobile device. Accordingly, at example block 508', all or part of a position fix for the object may be determined based, at least in part, on one or more responses received at block 506, and one or more of the first (locally obtained) positioning measurement values.

By way of further some further example implementations of the various techniques provided herein, a person (object) holding or carrying a first mobile device such as a smartphone may also wear or carry a second mobile device attached to a particular point on the person's body. For example, a person may wear a smart watch on his/her wrist, in addition to carrying a smartphone in his/her pocket or purse, etc. Like the smartphone, the second mobile device may comprise communication interface capable of transmitting and receiving signals in support of a wireless signal based positioning process as previously mentioned. In a particular example implementation, a wireless communication link (e.g., Bluetooth or near field communication (NFC) link) may be established between the smartphone and the second mobile device to allow for a combination or merging of positioning measurement values obtained at one mobile device with observations obtained at the other mobile device.

In one example implementation, positioning measurement values obtained at a smartphone or a second mobile device may be used for computing a position fix (e.g., an estimated location of the object, or the like). A second mobile device (e.g., such as a smart watch) may similarly obtain such positioning measurement values also useful for computing a position fix. According to certain implementations, signal acquisition tasks for obtaining a position fix may be allocated between or among multiple mobile devices co-located with the object.

Regarding positioning processes in a particular implementation, different mobile devices may share a burden of obtaining positioning measurement values based on the same radio technology/technologies. For example, if both smartphone and wearable device have WiFi enabled communication interfaces, a request for assistance initiated by the smartphone may select one or more signal acquisition tasks to be performed locally or externally (with respect to the smartphone) in some manner to allocate applicable WiFi scanning tasks.

For example, in certain instances, signal acquisition tasks may be allocated such that the smartphone (locally) scans for wireless positioning signals from access point (AP) devices or the like transmitted at a first band/channel corresponding to 2.4 GHz, and (via a selected subset of signal acquisition tasks) the second mobile device scans for wireless positioning signals from AP devices or the like transmitted at a first band/channel corresponding to 5 Ghz.

For example, in certain instances, signal acquisition tasks may be allocated such that the smartphone (locally) scans for wireless positioning signals from AP devices or the like transmitted on 802.11 channels 1 and 6, a second mobile device scans for wireless positioning signals from AP devices or the like transmitted 802.11 channel 10, and a third mobile device scans for wireless positioning signals from AP devices or the like transmitted 802.11 channel 11.

For example, in certain instances, signal acquisition tasks may be allocated such that the smartphone (locally) obtains one or more signal measurement values corresponding to an estimated propagation time (e.g., RTT, etc.) from AP devices or the like (that may be capable of consistent RTT (consistent SIFS)), and (via a selected subset of signal acquisition tasks) the second mobile device may obtain one or more signal measurement values corresponding to signal strength measurements (e.g., an RSSI, etc.) for wireless positioning signals from such AP devices or the like.

In certain instances, one or more signal acquisition tasks may be allocated using the example techniques herein, to possibly stagger discovery scans, particularly in situations wherein discovery scans may be operatively expensive and performing them frequently may increase power-consumption. Thus, for example, in certain instances a request for assistance may be timed in some to stagger or otherwise control the performance of certain tasks. In certain example implementations, a request for assistance may comprise a task schedule and/or a response schedule, which may stagger or otherwise control the performance of such tasks and/or response transmissions. In certain instances, one or more signal acquisition tasks and/or response transmissions may be conditionally staggered or otherwise controlled via a task schedule, a response schedule, and/or the like or some combination thereof.

In certain example implementations, one or more signal acquisition tasks may be allocated based, at least in part, on a direction of motion, type of motion, and/or the like for an object (e.g., based on one or more sensors onboard one or more co-located mobile devices, a positioning process, etc.).

In certain instances, signal measurement values obtained via two or more different mobile devices may be adjusted, for example, to calibrate for or otherwise consider different receiver gains, processing delays, etc. In one implementation, timing delays in connection with an NFC communication link or the like between two co-located mobile devices may be considered. Furthermore, different receiver gains at a first mobile device and a second mobile device may be calibrated using a two-way calibration technique. In certain instances, a first mobile device may affect an operation of one or more sensors onboard one or more of the co-located mobile devices. For example, a request for assistance may be indicative a desire for one or more sensor measurement values corresponding to one or more sensors, and a response may be indicative of one or more sensor measurement values. Furthermore, in certain example implementations, one or more sensor measurement values may be provided to a positioning process and/or otherwise used, at least in part, to determine a position fix or the like for an object.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a first mobile device:
   establishing a Bluetooth communication link between said first mobile device and a second mobile device;
   initiating a navigation operation on said first mobile device comprising a plurality of positioning operations;
   receiving one or more signals comprising an identification of at least one operative condition of said second mobile device via said Bluetooth communication link, wherein said first mobile device and said second mobile device are co-located with an object, and said identification of at least one operative condition is indicative of an ability of said second mobile device to provide one or more types of assistance;
   transmitting one or more signals to said second mobile device comprising a request that said second mobile device perform a subset of said plurality of positioning operations of said navigation operation, said subset comprising:
      obtaining measurements of:
         one or more satellite positioning system signals; or one or more wide area network (WAN) positioning
signals; or
on or more WiFi positioning signals; or
any combination of a plurality of the foregoing; or
calculating location of said second mobile device; or
a combination thereof;
processing a response received from said second mobile device via said Bluetooth communication link as part of said navigation operation, said response comprising information, or instruction, based on said subset of said plurality of positioning operations.

2. The method as recited in claim 1, and further comprising with said first mobile device:
obtaining a position fix for said object based, at least in part, on said response.

3. The method as recited in claim 2, and further comprising with said first mobile device:
performing at least one of said plurality of signal acquisition tasks not represented in said request to obtain one or more positioning measurement values based, at least in part, on one or more wireless positioning signals acquirable by said first mobile device; and
determining said position fix for said object based further, at least in part, on said one or more positioning measurement values.

4. The method as recited in claim 1, wherein said response is indicative of one or more second positioning measurement values based, at least in part, on one or more second wireless positioning signals acquirable by said second mobile device.

5. The method as recited in claim 1, and further comprising, at said first mobile device:
selecting at least one signal acquisition task of said subset of signal acquisition tasks based, at least in part, on a type of wireless positioning signal acquirable by said second mobile device.

6. The method as recited in claim 5, wherein said type of wireless positioning signal is indicative, at least in part, of one or more wireless technologies.

7. The method as recited in claim 5, wherein said type of wireless positioning signal is indicative, at least in part, of one or more transmitting devices.

8. The method as recited in claim 5, wherein said type of wireless positioning signal is indicative, at least in part, of one or more frequency bands.

9. The method as recited in claim 5, wherein said type of wireless positioning signal is indicative, at least in part, of one or more signaling channels.

10. The method as recited in claim 5, wherein said type of wireless positioning signal is indicative, at least in part, of a positioning measurement value attainable by said second mobile device.

11. The method as recited in claim 10, wherein said positioning measurement value is indicative of a measurement value resolution attainable by said second mobile device.

12. The method as recited in claim 11, wherein said positioning measurement value is indicative of a signal strength measurement attainable by said second mobile device.

13. The method as recited in claim 11, wherein said positioning measurement value is indicative of a signal propagation time measurement attainable by said second mobile device.

14. The method as recited in claim 1, wherein said request is further indicative of a task schedule corresponding to at least one of said one or more of said plurality of signal acquisition tasks to be performed by said second mobile device.

15. The method as recited in claim 1, wherein said request is further indicative of a response schedule corresponding to transmitting said response.

16. The method as recited in claim 1, and further comprising, at said first mobile device, at least:
selecting at least one signal acquisition task of said subset of signal acquisition tasks based, at least in part, on an operative condition corresponding to said first mobile device or said second mobile device.

17. The method as recited in claim 1, wherein said object comprises a person, and at least one of said first mobile device or said second mobile device comprises a wearable computing device.

18. An apparatus for use in a first mobile device, the apparatus comprising:
means for establishing a Bluetooth communication link between said first mobile device and a second mobile device;
means for initiating a navigation operation on said first mobile device comprising a plurality of positioning operations;
means for processing one or more signals received from said second mobile device via said Bluetooth communication link, said one or more signals comprising an identification of at least one operative condition of said second mobile device, wherein said first mobile device and said second mobile device are co-located with an object, and said identification of at least one operative condition is indicative of an ability of said second mobile device to provide one or more types of assistance;
means for transmitting one or more signals to said second mobile device comprising a request that said second mobile device perform a subset of said plurality of positioning operations of said navigation operation, said subset comprising:
obtaining measurements of:
one or more satellite positioning system signals; or
one or more wide area network (WAN) positioning signals; or
on or more WiFi positioning signals; or
any combination of a plurality of the foregoing; or
calculating location of said second mobile device; or
a combination thereof;
means for receiving a response to said request from said second mobile device via said Bluetooth communication link as part of said navigation operation, said response comprising information, or instruction, based on said subset of said plurality of positioning operations; and
means for obtaining a position fix for said object based, at least in part, on said response.

19. The apparatus as recited in claim 18, and further comprising:
means for performing at least one signal acquisition task of said plurality of signal acquisition tasks not represented in said request to obtain one or more positioning measurement values based, at least in part, on one or more wireless positioning signals acquirable by said first mobile device; and
wherein said means for determining said position fix for said object is based further, at least in part, on said one or more positioning measurement values.

20. The apparatus as recited in claim 19, and further comprising, at said first mobile device:
  means for selecting at least one signal acquisition task of said subset of signal acquisition tasks based, at least in part, on a type of wireless positioning signal acquirable by said second mobile device; an operative condition corresponding to said first mobile device; or a second operative condition corresponding to said second mobile device; or a combination thereof.

21. The apparatus as recited in claim 19, wherein said request is further indicative of a task schedule corresponding to at least one signal acquisition task of one or more of said plurality of signal acquisition tasks to be performed by said second mobile device, a response schedule corresponding to transmitting said response, or a combination thereof.

22. A first mobile device comprising:
  a communication interface; and
  a processing unit to:
    establish a Bluetooth communication link between said first mobile device and a second mobile device via said communication interface;
    initiate a navigation operation on said first mobile device comprising a plurality of positioning operations;
    process one or more signals received from said second mobile device via said Bluetooth communication link, said one or more signals comprising an identification of at least one operative condition of said second mobile device, wherein said first mobile device and said second mobile device are co-located with an object, and said identification of at least one operative condition is indicative of an ability of said second mobile device to provide one or more types of assistance;
    initiate transmission of one or more signals to said second mobile device, via said Bluetooth communication link, comprising a request that said second mobile device perform a subset of positioning operations of said navigation operation, said subset comprising:
      obtaining measurements of:
        one or more satellite positioning system signals; or
        one or more wide area network (WAN) positioning signals; or
        on or more WiFi positioning signals; or
        any combination of a plurality of the foregoing; or
      calculating location of said second mobile device; or
      a combination thereof;
    process a response to said request obtained from said second mobile device via said Bluetooth communication link as part of said navigation operation, said response comprising information, or instruction, based on said subset of said plurality of positioning operations; and
    obtain a position fix for said object based, at least in part, on said response.

23. The first mobile device as recited in claim 22, wherein said response is indicative of one or more second positioning measurement values based, at least in part, on one or more second wireless positioning signals acquirable by said second mobile device, and wherein said processing unit to further configured to:
  initiate performance of at least one of said plurality of signal acquisition tasks not represented in said request to obtain one or more positioning measurement values based, at least in part, on one or more wireless positioning signals acquirable by said communication interface; and
  determine said position fix for said object based further, at least in part, on said one or more positioning measurement values.

24. The first mobile device as recited in claim 22, wherein said processing unit further configured to:
  select at least one signal acquisition task of said subset of signal acquisition tasks based, at least in part, on a type of wireless positioning signal acquirable by said second mobile device.

25. The first mobile device as recited in claim 24, wherein said type of wireless positioning signal is indicative, at least in part, of: one or more wireless technologies; one or more transmitting devices; one or more frequency bands; one or more signaling channels; a type of positioning measurement value; an operative condition corresponding to said first mobile device; or a second operative condition corresponding to said second mobile device; or a combination thereof.

26. The first mobile device as recited in claim 22, wherein said request is further indicative of a task schedule corresponding to at least one signal acquisition task of said one or more of said plurality of signal acquisition tasks to be performed by said second mobile device; or a response schedule corresponding to transmitting said response; or a combination thereof.

27. An article comprising:
  a non-transitory computer readable medium having stored therein computer implementable instructions executable by a processing unit of a first mobile device to:
    establish a Bluetooth communication link between said first mobile device and a second mobile device;
    initiate a navigation operation on said first mobile device comprising a plurality of positioning operations;
    process one or more signals received from said second mobile device via said Bluetooth communication link, said one or more signals comprising an identification of at least one operative condition of a second mobile device, wherein said first mobile device and said second mobile device are co-located with an object, and said identification of at least one operative condition is indicative of an ability of said second mobile device to provide one or more types of assistance;
    initiate transmission of one or more signals to said mobile device comprising a request that said second mobile device perform a subset of said plurality of positioning operations of said navigation operation, said subset comprising:
      obtaining measurements of:
        one or more satellite positioning system signals; or
        one or more wide area network (WAN) positioning signals; or
        on or more WiFi positioning signals; or
        any combination of a plurality of the foregoing; or
      calculating location of said second mobile device; or
      a combination thereof;
    means for processing one or more signals received from said second mobile device via said Bluetooth communication link, said one or more signals comprising an identification of at least one operative condition of said second mobile device, wherein said first mobile device and said second mobile device are co-located with an object, and said identification of at least one operative condition is indicative of an ability of said second mobile device to provide one or more types of assistance;
    process a response to said request obtained from said second mobile device via said Bluetooth communication link as part of said navigation operation, said response comprising information, or instruction, based on said subset of said plurality of positioning operations; and obtain a position fix for said object based, at least in part, on said response.

28. The article as recited in claim 27, said computer implementable instructions being further executable by said processing unit to:

initiate performance at least one signal acquisition task of said plurality of signal acquisition tasks not represented in said request to obtain one or more positioning measurement values based, at least in part, on one or more wireless positioning signals acquirable by said first mobile device; and determine said position fix for said object based further, at least in part, on said one or more positioning measurement values.

29. The article as recited in claim 27, said computer implementable instructions being further executable by said processing unit to:

select at least one signal acquisition task of said subset of signal acquisition tasks based, at least in part, on a type of wireless positioning signal acquirable by said second mobile device; an operative condition corresponding to said first mobile device; or a second operative condition corresponding to said second mobile device; or a combination thereof.

30. The article as recited in claim 27, wherein said request is further indicative of: a task schedule corresponding to: said at least one signal acquisition task of said plurality of signal acquisition tasks to be performed by said second mobile device; or a response schedule corresponding to transmitting said response; or a combination thereof.

31. The method as recited in claim 1, wherein said determination that that said first mobile device is unavailable, unable, or less suitable to perform at least one signal acquisition task of said plurality of signal acquisition tasks is based, at least in part, on a determination that said first mobile device busy with other processes or signaling is obstructed, or a combination thereof.

32. The method as recited in claim 2, further comprising presenting at least an indication of said positioning fix via an output unit of said first mobile device.

* * * * *